United States Patent [19]

Johannes

[11] 3,862,341
[45] Jan. 21, 1975

[54] BROWNIE FROSTING DRY MIX

[75] Inventor: James H. Johannes, Minneapolis, Minn.

[73] Assignee: General Mills, Inc., Minneapolis, Minn.

[22] Filed: Dec. 3, 1973

[21] Appl. No.: 420,822

[52] U.S. Cl................. 426/162, 426/174, 426/201, 426/296, 426/363
[51] Int. Cl.............................................. A23g 1/00
[58] Field of Search..................... 426/162, 174, 201

[56] References Cited
UNITED STATES PATENTS

| | | | |
|---|---|---|---|
| 3,343,965 | 9/1967 | Gass | 426/162 |
| 3,656,971 | 4/1972 | Reimer | 426/201 |
| 3,767,830 | 10/1973 | Reimer | 426/162 |

Primary Examiner—Samih N. Zaharna
Assistant Examiner—J. M. Hunter
Attorney, Agent, or Firm—Anthony A. Juettner; Gene O. Enockson; Elizabeth Tweedy

[57] ABSTRACT

A brownie frosting dry mix which when reconstituted can be baked with a particular reconstituted brownie dry mix to produce a frosted brownie.

3 Claims, No Drawings

BROWNIE FROSTING DRY MIX

This invention relates to a frosting dry mix especially useful with a particular brownie dry mix. More particularly, this invention relates to a brownie frosting dry mix which when reconstituted can be put in the bottom of a pan, a particular reconstituted brownie dry mix placed on top of it, and the combination baked to produce a frosted brownie. The frosting is of the fudgy brownie type.

Heretofore, frosted brownies have been made by first baking a brownie and cooling at least an hour before frosting. The frosting was made by boiling together butter, corn syrup and cocoa ingredients. After cooking the frosting was spread on the cooled brownie. When the frosting mixtures, commonly used by first boiling the mixture and then spreading on cooled brownies, were subjected instead to baking with a brownie batter, the result was a runny, tacky frosting. The final product was not acceptable.

It has now been found that a particular brownie frosting dry mix can be reconstituted, placed in the bottom of a baking pan, a particular reconstituting brownie dry mix can be poured over the raw reconstituted frosting dry mix and the combination baked together. After baking, the baking pan is inverted and the frosted brownies removed. The frosted brownies are ready to serve in 10 or 15 minutes after baking. There is a distinct interface between the frosting layer and the brownie layer. Both components are of excellent eating quality.

The brownie frosting dry mix composition of this invention consists essentially of:

about 68 to 75 percent sucrose by weight of the frosting dry mix composition, about 10 to 16 percent cocoa by weight of the frosting dry mix composition, and about 9 to 13 percent plastic shortening by weight of the dry mix composition.

The sucrose used has a granulation of from 40 to 70 percent through 100 U.S. Screen.

The cocoa used in the frosting dry mix of this invention can be of any commonly used grade, i.e., breakfast cocoa, dutch processed cocoa, low fat cocoa.

The shortening useful in the frosting dry mix is plastic and has a solid fat index of about:

| Temperature,°F. | SFI,% |
|---|---|
| 50 | 29–33 |
| 70 | 21–24 |
| 80 | 19–22 |
| 92 | 14–17 |
| 104 | 8–10 |

The shortening may be of animal or vegetable origin. Animal derived shortening such as tallow, lard and rearranged lard are preferred. Ingredients such as additional flavoring, nuts and emulsifiers may be added to the above dry mix as desired. When calculating the percentage dry mix composition, however, these additional ingredients should not be included in the calculation. As an optional ingredient, polyoxyethylene sorbitan stearate or mono and diglycerides in amounts up to about 0.8 percent by weight of brownie frosting dry mix improves the dispersibility of the dry mix in water.

The basic dry brownie mix useful with the above frosting dry mix for simultaneous baking consists essentially of:

about 45 to 55 percent sucrose by weight of the dry brownie mix composition, about 20 to 22 percent wheat flour by weight of the dry brownie mix composition, said wheat flour having protein level of about 10 to 10.5 percent by weight of the wheat flour, about 12 to 18 percent shortening by weight of the dry mix composition, about 5 to 10 percent cocoa by weight of the dry brownie mix composition, and about 0.5 to 2.5 percent corn or wheat starch by weight of the dry brownie mix composition.

Corn or wheat starch, either non-gelatinized or gelatinized, can be used. The pregelatinized starches preferably are used in the amount of about 0.5 to 1 percent by weight of the dry mix composition. The non-gelatinized starch can be used in an amount of about 1.0 to 2.5 percent by weight of the dry mix composition. The starch acts as a viscosity builder. The shortening may be the same type as used in the frosting dry mix. Flavorings, nuts, fruits and the like can be added as desired but should not be included when calculating the composition of the dry mix.

Each of the above dry mixes is prepared by blending the dry ingredients and extruding and blending the shortening into the other ingredients to form a free flowing mixture.

The final consumer can use the above combination of dry mix compositions by reconstituting each, placing the reconstituted frosting mix in the bottom of a baking pan, placing the reconstituted brownie mix on top of the reconstituted frosting mix and baking the combination for a period equivalent to about 30 to about 35 minutes at a temperature of about 350°F. The frosting dry mix can be reconstituted with about 25 to 35 grams melted butter and about 40 to 50 ml. of hot tap water per 198 grams of dry mix. The brownie dry mix can be reconstituted with about 100 to 130 grams of whole eggs and about 40 to 50 ml. water per 450 grams of the dry mix.

Below are specific examples of the variations in ingredient proportions of the above dry mixes.

EXAMPLE I

This example illustrates the use of different sugars in typical frosting dry mixes of this invention.

In the formulation of

|  | Percentage of Dry Mix By Weight |
|---|---|
| Sugar | 73.00 |
| Cocoa | 14.00 |
| Shortening* | 13.00 |

*A plastic tallow base shortening containing tallow flakes and rearranged lard in amounts up to about 10% by weight, stabilized with butylhydroxy toluene and butylhydroxy anisol having a SFI of

| Temperature,°F. | SFI,% |
|---|---|
| 50 | 29–33 |
| 70 | 21–24 |
| 80 | 19–22 |
| 92 | 14–17 |
| 104 | 8–10 | three different sugars were used.

| Sample 1 | Sucrose, 40 to 60% through a 100 U. S. Screen |
| Sample 2 | Confectionery sucrose, 100% through a 100 U. S. Screen |
| Sample 3 | Dextrose corn sugar |

The samples were reconstituted in 30 grams of butter and 45 ml. of hot tap water per 199 grams of the dry mix. The reconstituted mixes were placed in baking pans and a reconstituted brownie mix having the formulation of:

| | Percentage of Dry Mix By Weight |
|---|---|
| Sucrose (40 to 60% through 100 U. S. Screen) | 54.40 |
| Wheat flour (10.5% protein) | 21.45 |
| Shortening* | 15.35 |
| Cocoa (10 to 12% fat) | 7.15 |
| Pregelatinized corn starch | 0.95 |
| Salt | 0.70 |

*Same as used in the frosting dry mix and reconstituted with 100 grams of whole eggs and 45 ml. of water per 453 grams of the dry mix was placed on top of the frosting. The combination was baked 33 minutes at a temperature of 350°F. The pans were then inverted and the brownie evaluated in 30 minutes.

The results were:
Sample 1 was acceptable as a frosted brownie,
Sample 2 had a smoother mouth feel than Sample 1,
Sample 3 was very thick, did not set up and did not spread well.

EXAMPLE II

This example illustrates the influence of the shortening level in the frosting dry mix.

The following frosting dry mix formulations were evaluated by the procedure set out in Example I:

| Sample | I | II | III |
|---|---|---|---|
| | \multicolumn{3}{c}{Percentage of Dry Mix By weight} | | |
| Sucrose (60% through 100 U. S. Screen) | 71.75 | 69.29 | 66.83 |
| Shortening* | 11.05 | 13.51 | 15.97 |
| Cocoa | 17.20 | 17.30 | 17.19 |
| Beatreme E (marketed by Beatrice Foods Co., dried, 62% mono and diglycerides with added shortening, non-fat milk solids and starch | 0.80 | 0.80 | 0.80 |

*Same as in Example I

The results were:
Sample I was firm and dry,
Sample II was more moist and softer, and
Sample III was preferred.

The embodiments of the invention in which an exclusive property or privilege is claimed are defined as follows:

1. A dry frosting mix consisting essentially of:
    about 68 to 75 percent sucrose by weight of the frosting dry mix composition,
    about 10 to 16 percent cocoa by weight of the frosting dry mix composition, and
    about 9 to 13 percent plastic shortening by weight of the dry mix composition, said plastic shortening having a solid fat index of about:

| Temperature, °F. | SFI,% |
|---|---|
| 50 | 29–33 |
| 70 | 21–24 |
| 80 | 19–22 |
| 92 | 14–17 |
| 104 | 8–10. |

2. The dry frosting mix of claim 1 wherein polyoxyethylene sorbitan stearate is included in amounts up to about 0.8 percent by weight of the dry frosting mix composition.

3. The dry frosting mix of claim 1 wherein mono and diglycerides are included in amounts up to about 0.8 percent by weight of the dry frosting mix composition.

* * * * *